United States Patent [19]

Nomura et al.

[11] Patent Number: 4,485,291

[45] Date of Patent: Nov. 27, 1984

[54] METHOD FOR CONTROLLING THE POSITION OF WELDING ELECTRODE IN ARC-WELDING WITH WEAVING

[75] Inventors: Hirokazu Nomura; Yuji Sugitani, both of Tsu, Japan

[73] Assignee: Nippon Kokan Kabushiki Kaisha, Tokyo, Japan

[21] Appl. No.: 483,496

[22] Filed: Apr. 11, 1983

[30] Foreign Application Priority Data

Apr. 26, 1982 [JP] Japan .................................. 57-68792

[51] Int. Cl.³ .............................................. B23K 9/12
[52] U.S. Cl. .......................... 219/124.22; 219/124.34; 219/125.12
[58] Field of Search ...................... 219/124.22, 124.34, 219/125.12

[56] References Cited

U.S. PATENT DOCUMENTS

| | | | |
|---|---|---|---|
| 4,151,395 | 4/1979 | Kushner et al. | |
| 4,316,075 | 2/1982 | Isoya et al. | 219/124.22 |
| 4,350,868 | 9/1982 | Takagi et al. | 219/124.22 |
| 4,380,695 | 4/1983 | Nelson | 219/124.34 |

FOREIGN PATENT DOCUMENTS

| | | |
|---|---|---|
| 2730350 | 2/1978 | Fed. Rep. of Germany . |
| 2478508 | 9/1981 | France . |
| 54-26261 | 2/1979 | Japan . |

Primary Examiner—C. C. Shaw
Attorney, Agent, or Firm—Frishauf, Holtz, Goodman & Woodward

[57] ABSTRACT

An arc-welding method, which comprises: arc-welding objects of welding together along the line of a groove formed between said objects of welding by continuously moving a welding electrode along the line of said groove while reciprocating said welding electrode in the width direction of said groove; characterized by: calculating at prescribed time intervals, for each one reciprocation of said welding electrode in the width direction of said groove, deviations (I-Io) of values (I) of one of arc current and arc voltage from a previously set reference value (Io), for each of left-side deviations (L) and right-side deviations (R) relative to the vertical plane which passes through the center of amplitude of said one reciprocation of said welding electrode and is parallel to the line of said groove; calculating at said time intervals, when said welding electrode moves over the left side of said groove relative to said vertical plane, differences (L−R) between said left-side deviations (L) and the immediately preceding right-side deviations (R), for controllably aligning the center of said amplitude of said one reciprocation of said welding electrode with the center of said groove in the width direction thereof at said prescribed time intervals so that said differences (L−R) become null; and, calculating at said prescribed time intervals, when said welding electrode moves over the right side of said groove relative to said vertical plane, differences (L−R) between said right-side deviations (R) and the immediately preceding left-side deviations (L), for controllably aligning the center of said amplitude of said one reciprocation of said welding electrode with the center of said groove in the width direction thereof at said prescribed time intervals so that said differences (L−R) become null.

1 Claim, 4 Drawing Figures

METHOD FOR CONTROLLING THE POSITION OF WELDING ELECTRODE IN ARC-WELDING WITH WEAVING

REFERENCE TO PATENTS, APPLICATIONS AND PUBLICATIONS PERTINENT TO THE INVENTION

So far as we know, a prior art document pertinent to the present invention is Japanese patent provisional publication No. 26,261/79 dated Feb. 27, 1979, the contents of which will be discussed hereafter under the heading of the "BACKGROUND OF THE INVENTION".

FIELD OF THE INVENTION

The present invention relates to a method for instantly aligning, when automatically arc-welding objects of welding together along the line of a groove formed between the objects of welding by continuously moving a welding electrode along the line of the groove while reciprocating the welding electrode in the width direction of the groove, the center of amplitude of a reciprocation of the welding electrode agreeing with the center of the groove in the width direction thereof.

BACKGROUND OF THE INVENTION

For the purpose of automatically welding objects of welding by the arc-welding method with a consumable or a non-consumable welding electrode, along the line of a groove formed between the objects of welding, an arc-welding method is known which comprises reciprocally moving the welding electrode in the width direction of the groove while maintaining a constant prescribed distance between the tip of the welding electrode and the groove face, and at the same time, continuously moving the welding electrode along the line of the groove.

In the above-mentioned arc-welding method, the most important point is that, even when the welding direction varies from one moment to the next, the center of amplitude of reciprocation of the welding electrode always agrees with the width center of the groove.

If the center of amplitude of reciprocation of the welding electrode does not agree with the width center of the groove, there occurs a difference in the amount of penetration between one object of welding and the other, and a uniform weld bead cannot be formed.

As a welding method which enables to make the center of amplitude of reciprocation of the welding electrode always agree with the width center of the groove even when the welding direction varies from one moment to the next, we proposed an arc-welding method as disclosed in Japanese patent provisional publication No. 26,261/79 dated Feb. 27, 1979 (hereinafter referred to as the "prior art").

The above-mentioned prior art is described in detail with reference to FIG. 1. In FIG. 1, 1' is an arc current detector; 2' is a low-pass filter which eliminates detrimental noise current from values (I) of the arc current continuously detected by the arc current detector 1'; 3' is a reference value setter which previously sets in a first differential amplifier described later, a reference value (Io) for the values (I), which corresponds to the arc current value at the moment when a welding electrode 4 inserted into a welding torch 4' is located at the width center of a groove 6 formed between objects of welding 5 and 5'; 7' is a first differential amplifier which continuously calculates, for each one reciprocation of the welding electrode 4 in the width direction of the groove 6, deviations (I−Io) of the values (I) of arc current which from the detrimental noise current has been eliminated by the low-pass fitter 2', from the reference value (Io); 8' is a changeover switch which switches over the deviations (I−Io) between left-side deviations (L) and right-side deviations (R) relative to the vertical plane which passes through the center of amplitude of each one reciprocation of the welding electrode 4 and is parallel to the line of the groove 6; 9' is a pulse signal generator which generates pulse signals for switching over the changeover switch 8' and pulse signals respectively for setting and resetting a left-side deviation integrator, a right-side deviation integrator, a left-side deviation memory and a right-side deviation memory described later; 10 is a left-side deviation integrator (hereinafter referred to as the "L-side integrator") which integrates the left-side deviations (L) switched over by the changeover switch 8'; 11 is a right-side deviation integrator (hereinafter referred to as the "R-side integrator") which integrates the right-side deviations (R) switched over by the changeover switch 8'; 12 is a left-side deviation memory (hereinafter referred to as the "L-side memory") which stores the integral values of left-side deviations (L) integrated by the L-side integrator 10 as the representative value (L') of the left-side deviations (L); 13 is a right-side deviation memory (hereinafter referred to as the "R-side memory") which stores the integral value of the right-side deviation (R) integrated by the R-side integrator 11 as the representative value (R') of the right-side deviations (R); 14' is a second differential amplifier which calculates, for each passage of the welding electrode 4 through the center of reciprocation thereof, the difference (L'−R') between the representative value (L') stored in the L-side memory 12 and the representative value (R') stored in the R-side memory 13; 15' is a motor drive controller which controllably drives a motor described later so that the difference (L'−R') becomes null; and, 16' is a motor which controllably moves the welding torch 4' in the width direction of the groove 6 on the basis of a driving signal from the motor drive controller 15', so that the center of amplitude of reciprocation of the welding electrode 4 agrees with the width center of the groove 6.

Now, the case in which, when the center of reciprocation amplitude of the welding electrode 4 deviates to the left relative to the width center of the groove 6, how the position of the welding electrode 4 is corrected so that the center of reciprocation amplitude of the welding electrode 4 agrees with the width center of the groove 6 by the above-mentioned prior art is described with reference to the signal wave form diagram of FIG. 2. In FIG. 2, the signal wave forms Ⓐ to Ⓕ correspond to the signal wave forms Ⓐ to Ⓕ in FIG. 1. First, the arc current detector 1' continuously detects the values (I) of arc current. The low-pass filter 2' eliminates detrimental noise current from the values (I). The first differential amplifier 7' continuously calculates, for each one reciprocation of the welding electrode 4 in the width direction of the groove 6, deviations (I−Io) (refer to Ⓐ in FIG. 2) of the values (I) from the reference value (Io) previously set by the reference value setter 3'. The changeover switch 8' switches over the deviations (I−Io) alternately between the left-side deviations (L) and the right-side deviations (R) relative to the vertical plane which passes through the center of reciprocation amplitude of the welding electrode 4 and is parallel to the line of the groove 6, by means of pulse signals from the pulse signal generator 9'. The L-side integrator 10 integrates the left-side deviations ($L_1$). Immediately after the completion of integration of the left-side deviations ($L_1$), the L-side integrator 10 is reset, and after the lapse of a prescribed period of time, is set again to integrate the next left-side deviations ($L_2$). The L-side integrator 10 is reset immediately thereafter, and is set again after the lapse of a prescribed period of time. The L-side integrator 10 repeats the above-mentioned operation, based on pulse signals from the pulse signal generator 9' (refer to ⒷⒷ in FIG. 2). The R-side integrator 11 integrates, on the other hand, the right-side deviations ($R_1$). Immediately after the completion of integration of the right-side deviations ($R_1$), the R-side integrator 11 is reset, and after the lapse of a prescribed period of time, is set again to integrate the next right-side deviations ($L_2$). The R-side integrator 11 is reset immediately thereafter, and is set again after the lapse of a prescribed period of time. The R-side integrator 11 repeats the above-mentioned operation, based on pulse signals from the pulse signal generator 9' (refer to Ⓒ in FIG. 2). The L-side memory 12 stores, for a period of up to the completion of integration of the next left-side deviations ($L_2$), the integral value of the left-side deviations ($L_1$) integrated by the L-side integrator 10 as the representative value ($L'_1$) of the left-side deviations ($L_1$). The L-side memory 12 is reset immediately thereafter, and then, immediately set to store, for a period of up to the completion of integration of the further next left-side deviations ($L_3$), the integral value of the next left-side deviations ($L_2$) as the representative value ($L'_2$) of the next left-side deviations ($L_2$). The L-side memory 12 repeats the above-mentioned operation, based on pulse signals from the pulse signal generator 9' (refer to Ⓓ in FIG. 2). The R-side memory 13 stores, on the other hand, for a period of up to the completion of integration of the next right-side deviations ($R_2$), the integral value of the right-side deviations ($R_1$) integrated by the R-side integrator 11 as the representative value ($R'_1$) of the right-side deviations ($R_1$). The R-side memory 13 is reset immediately thereafter, and then, immediately set to store, for a period of up to the completion of integration of the further next right-side deviations ($R_3$), the integral value of the next right-side deviations ($R_2$) as the representative value ($R'_2$) of the next right-side deviations ($R_2$). The R-side memory 13 repeats the above-mentioned operation, based on pulse signal from the pulse signal generator 9' (refer to Ⓔ in FIG. 2. The second differential amplifier 14' calculates, upon the completion of integration of the right-side deviations ($R_1$), the difference ($L'_1 - R'_1$) between the representative value ($L'_1$) of the left-side deviations ($L_1$) stored in the L-side memory 12 and the representative value ($R'_1$) of right-side deviations ($R_1$) stored in the R-side memory 13, and then, calculates the difference ($L'_2 - R'_1$) between the representative value ($L'_2$) of the left-side deviations ($L_2$) stored in the L-side memory 12 and the representative value ($R'_1$) of the right-side deviations ($R_1$) stored in the R-side memory 13 (refer to Ⓕ of FIG. 2). Similarly, the second differential amplifier 14' calculates the differences ($L'_2 - R'_2$) and ($L'_3 - R'_2$). The motor drive controller 15' drives the motor 16' so that the differences ($L'_1 - R'_1$), ($L'_2 - R'_1$), ($L'_2 - R'_2$) and ($L'_3 - R'_2$) become null for each calculation of these differences, to move the welding electrode 4 in the width direction of the groove 6, whereby the amplitude center of the welding electrode 4 finally agrees with the width center of the groove 6.

According to the prior art described above, it is possible to always align the center of amplitude of reciprocation of the welding electrode with the width center of the groove even when the welding direction varies from a moment to the next.

The above-mentioned prior art involves however the following problem. As is clear from FIG. 2, the above-mentioned difference ($L'_1 - R'_1$) is obtained, for example, by calculating the difference between the representative value ($L'_1$) of left-side deviations ($L_1$) stored in the L-side memory 12, and the representative value ($R'_1$) of right-side deviations ($R_1$) stored in the R-side memory 13. The representative value ($R'_1$) is however stored in the R-side memory 13 only after the completion of integration of right-side deviations ($R_1$). The difference ($L'_2 - R'_1$) is similarly obtained by calculating the difference between the representative value ($L'_2$) of the next left-side deviations ($L_2$) stored in the L-side memory 12, and the representative value ($R'_1$) of the right-side deviations ($R_1$) stored in the R-side memory 13. The representative value ($L'_2$) is however stored in the L-side memory 12 only after the completion of integration of the left-side deviations ($L_2$). This means that the position of the center of reciprocation of the welding electrode 4 is corrected always with a certain lag, resulting in a lower response of the welding electrode 4. This is particularly problematic when carrying out high-speed welding, hindering formation of a uniform weld bead.

Under such circumstances, there is a demand for a method for controlling the position of a welding electrode in arc-welding with weaving which gives a high response of the welding electrode and always permits alignment of the reciprocation center of the welding electrode with the width center of the groove even when carrying out high-speed welding, but such a method is not as yet proposed.

SUMMARY OF THE INVENTION

An object of the present invention is therefore to provide a method for controlling the position of a welding electrode in arc-welding with weaving which gives a high response of the welding electrode and always permits alignment of the reciprocation center of the welding electrode with the width center of the groove even when carrying out high-speed welding.

In accordance with one of the features of the present invention, in a method for controlling the position of a welding electrode in arc-welding with weaving, which comprises:

directing a welding electrode substantially vertically toward a groove formed between objects of welding; continuously moving said welding electrode along the line of said groove while reciprocating said welding electrode in the width direction of said groove; feeding, on the other hand, a welding current to said welding electrode to produce an arc between the tip of said welding electrode and said groove to weld said objects of welding together along the line of said groove by means of the arc heat; continuously detecting values (I) of one of arc current and arc voltage of said arc during said welding; continuously calculating deviations ($I - I_o$) of the thus detected values (I) from a previously set reference value (Io) of one of arc current and arc voltage for each one reciprocation of said welding electrode in the width direction of said groove; continuously calculating, relative to the vertical plane which passes through the center of amplitude of said one reciprocation of said welding electrode and is parallel to the line of said groove, a representative value (L') of left-side deviations (L) of said deviations (I−Io) and a representative value (R') of right-side deviations (R) of said deviations (I−Io); continuously calculating the difference (L'−R') between said representative value (L') of said left-side deviations (L) and said representative value (R') of said right-side deviations (R); and, controllably aligning the center of said amplitude of said one reciprocation of said welding electrode with the center of said groove in the width direction thereof so that said difference (L'−R') becomes null;

there is provided the improvement characterized by:

storing said left-side deviations (L) and said right-side deviations (R) at prescribed time intervals, which time intervals are within the range of from 1/1000 to 1/4000 second;

calculating at said prescribed time intervals, when said welding electrode moves over the left side of said groove relative to said vertical plane, differences (L−R) between said left-side deviations (L) at said prescribed time intervals during said left-side movement of said welding electrode, on one hand, and said stored right-side deviations (R) at said prescribed time intervals during the immediately preceding right-side movement of said welding electrode over the right side of said groove relative to said vertical plane, on the other hand; and controllably aligning the center of said amplitude of said one reciprocation of said welding electrode with the center of said groove in the width direction thereof at said prescribed time intervals so that said differences (L−R) become null; and, calculating, at said prescribed time intervals, when said welding electrode moves over the right side of said groove relative to said vertical plane, differences (L−R) between said right-side deviations (R) at said prescribed time intervals during said right-side movement of said welding electrode, on one hand, and said stored left-side deviations (L) at said prescribed time intervals during the immediately preceding left-side movement of said welding electrode over the left-side of said groove relative to said vertical plane, on the other hand; and controllably aligning the center of said amplitude of said one reciprocation of said welding electrode with the center of said groove in the width direction thereof at said prescribed time intervals so that said differences (L−R) become null.

DETAILED DESCRIPTION OF PREFERRED EMBODIMENTS

We carried out extensive studies with a view to solving the above-mentioned problem.

As a result, we obtained the following finding that: it is possible to always align the center of amplitude of a welding electrode with the width center of a groove, because of a good response of the welding electrode, even when carrying out high-speed welding, thus permitting formation of a uniform weld bead, by continuously calculating, for each one reciprocation of the welding electrode in the width direction of the groove, deviations (I−Io) of the detected values (I) of one of arc current and arc voltage from a previously set reference value (Io); storing at prescribed time intervals within the range of from 1/1000 to 1/4000 second, relative to the vertical plane which passes through the center of amplitude of said one reciprocation of said welding electrode and is parallel to the line, left-side deviations (L) and right-side deviations (R) of said deviations (I−Io); calculating at said prescribed time intervals, when said welding electrode moves over the left side of said groove relative to said vertical plane, differences (L−R) between said left-side deviations (L) at said prescribed time intervals during said left-side movement of said welding electrode, on one hand, and said stored right-side deviations (R) at said prescribed time intervals during the immediately preceding right-side movement of said welding electrode over the right side of said groove relative to said vertical plane, on the other hand; and controllably aligning the center of said amplitude of said one reciprocation of said welding electrode with the center of said groove in the width direction thereof at said prescribed time intervals so that said differences (L−R) become null; and, calculating at said prescribed time intervals, when said welding electrode moves over the right side of said groove relative to said vertical plane, differences (L−R) between said right-side deviations (R) at said prescribed time intervals during said right-side movement of said welding electrode, on one hand, and said stored left-side deviations (L) at said prescribed time intervals during the immediately preceding left-side movement of said welding electrode over the left side of said groove relative to said vertical plane, on the other hand; and controllably aligning the center of said amplitude of said one reciprocation of said welding electrode with the center of said groove in the width direction thereof at said prescribed time intervals so that said differences (L−R) become null.

Figure 1:
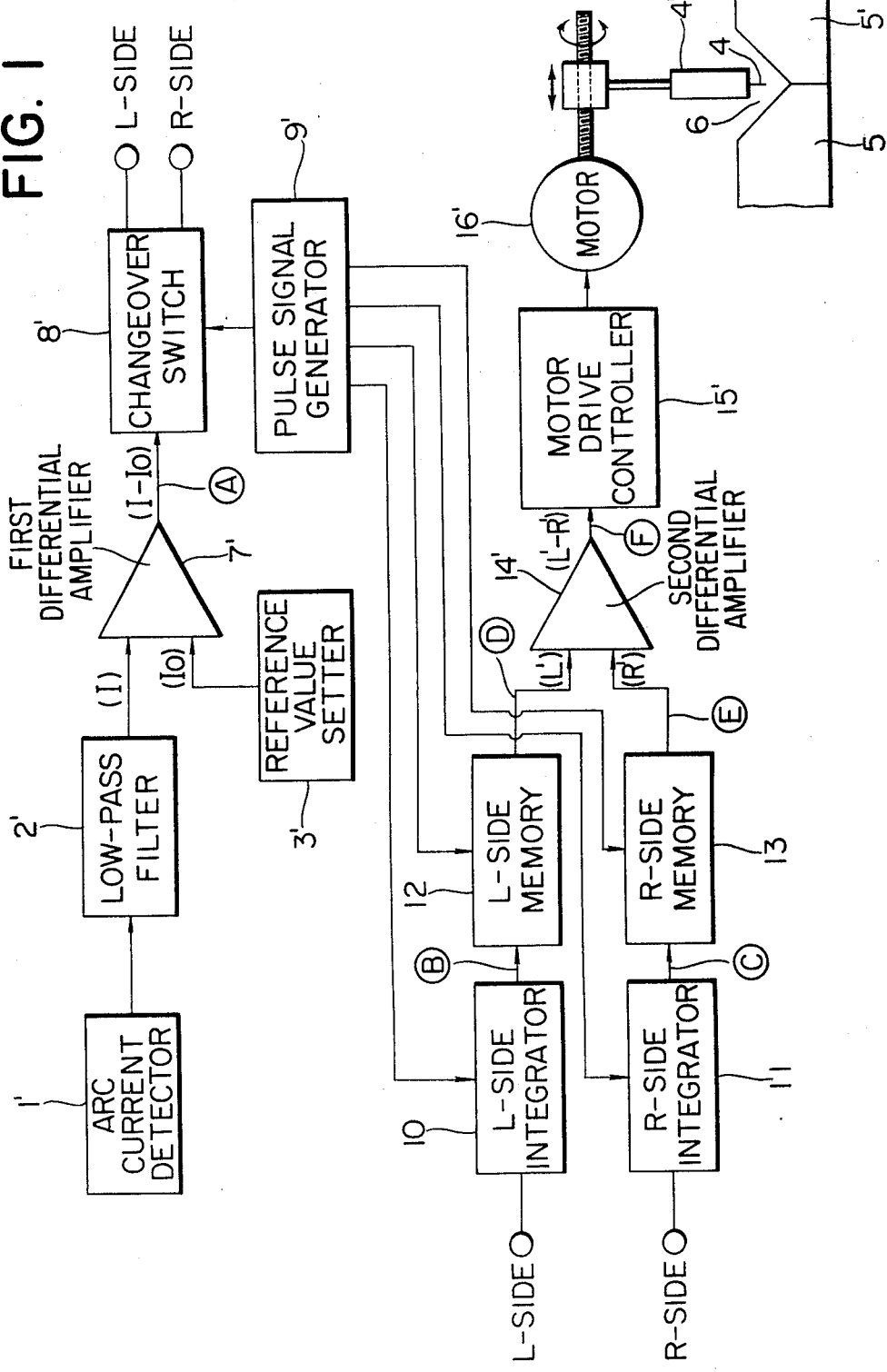
FIG. 1 is a block diagram illustrating the prior art.
Figure 2:
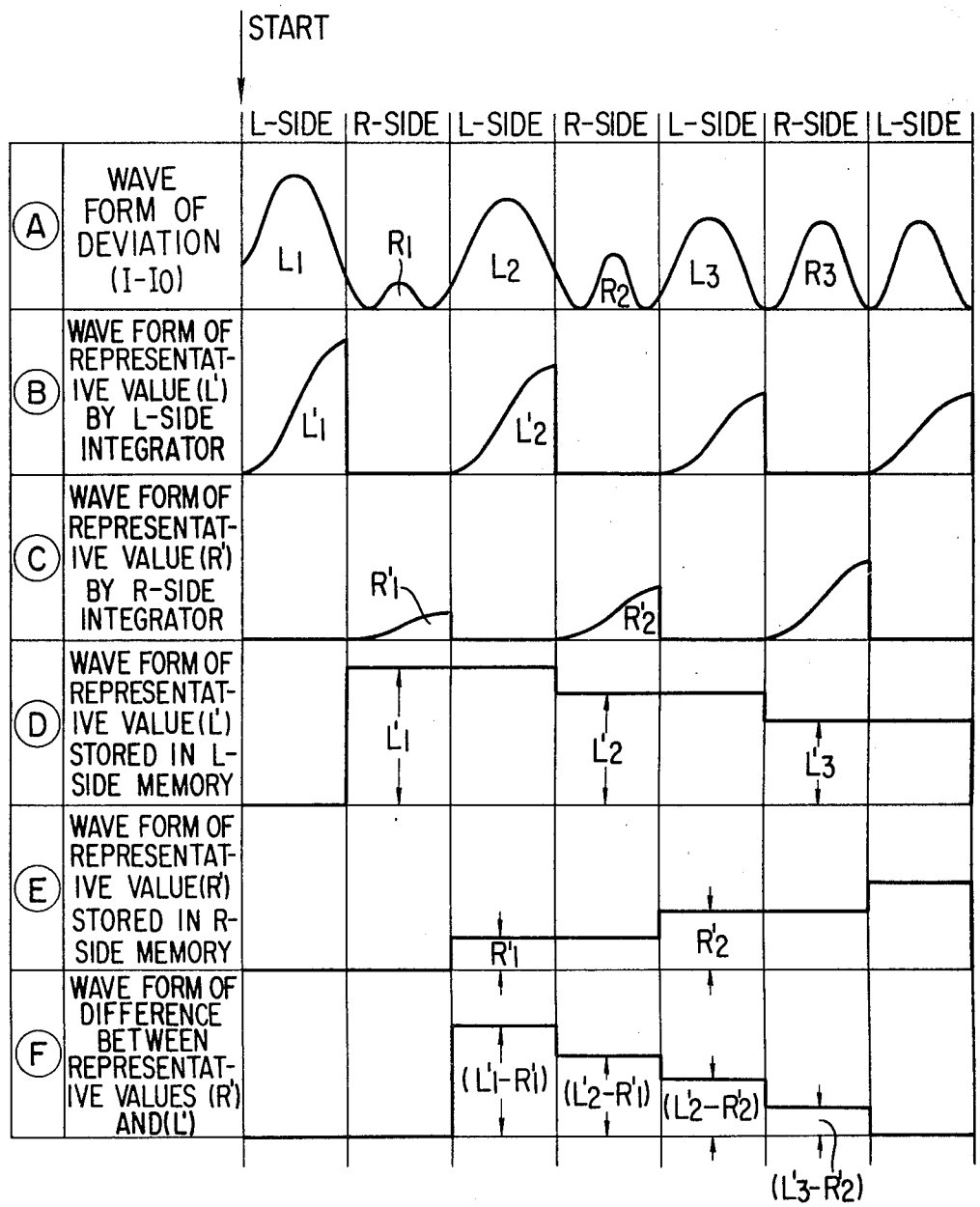
FIG. 2 is a signal wave form diagram of the individual parts in FIG. 1.
Figure 3:
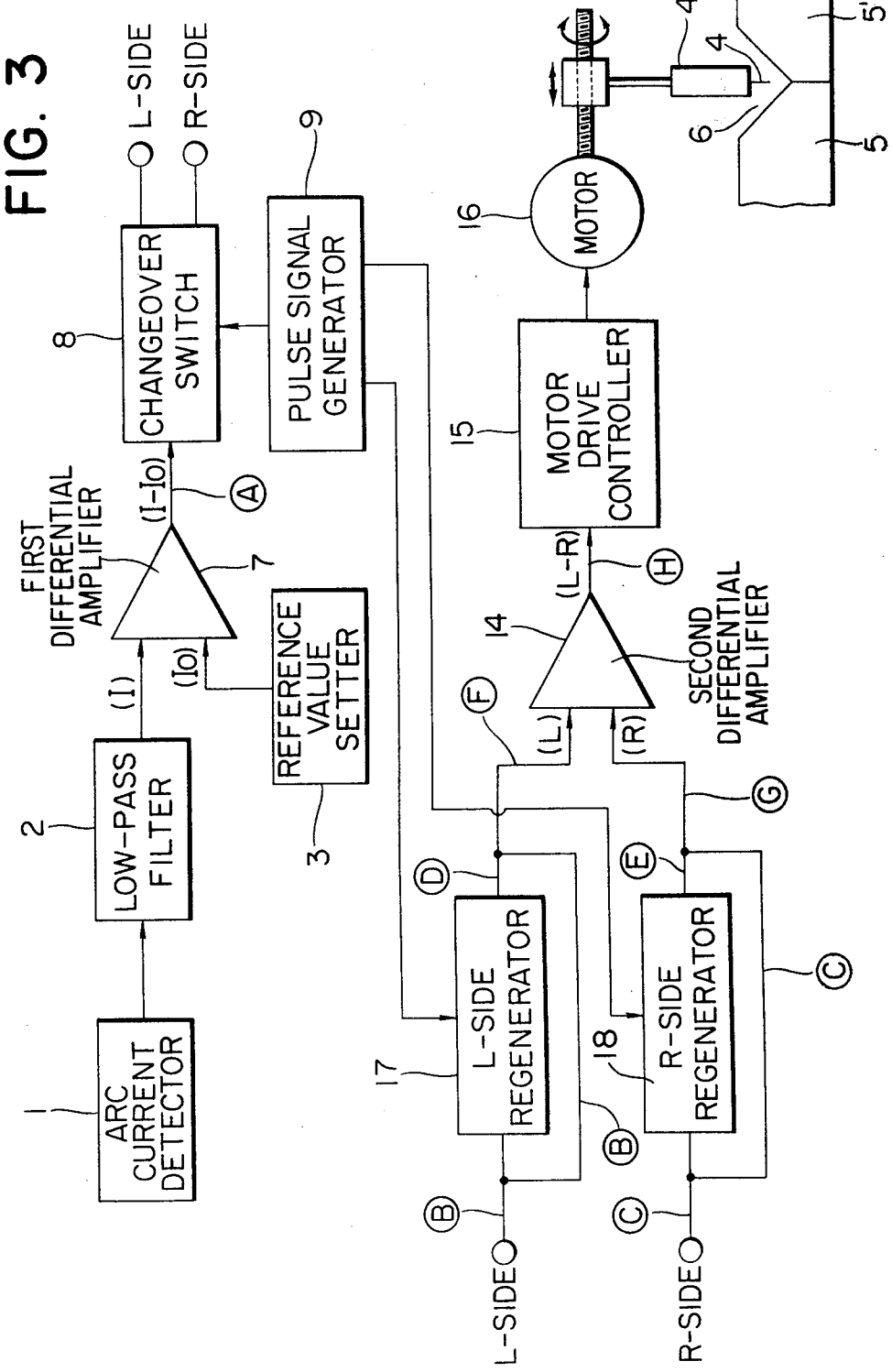
FIG. 3 is a block diagram illustrating an embodiment of the present invention; and, FIG. 4 is a signal wave form diagram of the individual parts in FIG. 3.

Now, an embodiment of the method of the present invention is described with reference to the drawings. FIG. 3 is a block diagram illustrating an embodiment of the method of the present invention. In FIG. 3, 1 is an arc current detector; 2 is a low-pass filter which eliminates detrimental noise current from values (I) of arc current continuously detected by the arc current detector 1; 3 is a reference value setter which previously sets in a first differential amplifier described later, a reference value (Io) for the values (I), which corresponds to the arc current value at the moment when a welding electrode 4 inserted into a welding torch 4' is located at the width center of a groove 6 formed between objects of welding 5 and 5'; 7 is a first differential amplifier which continuously calculates, for each one reciprocation of the welding electrode 4 in the width direction of the groove 6, deviations (I−Io) of the values (I) of arc current from which the detrimental noise current has been eliminated by the low-pass filter 2, from the reference value (Io); 8 is a changeover switch which alternately switches over the deviations (I−Io) between left-side deviations (L) and right-side deviations (R)

relative to the vertical plane which passes through the center of amplitude of each one reciprocation of the welding electrode 4 and is parallel to the line of the groove 6; 9 is a pulse signal generator which generates pulse signals for alternately switching over the changeover switch 8 and pulse signals for determining the timing for operating a left-side deviation regenerator and a right-side deviation regenerator described later; 17 is a left-side deviation regenerator (hereinafter referred to as the "L-side regenerator") which stores at prescribed time intervals within the range of from 1/1,000 to 1/4,000 second, said left-side deviations (L) produced during the left-side movement of the welding electrode 4 relative to said vertical plane, switched over by the changeover switch 8, and regenerates at said prescribed time intervals, said stored left-side deviations (L) when the welding electrode 4 then moves over the right side of the groove 6 relative to said vertical plane; the L-side regenerator 17 repeats storage and regeneration of said left-side deviations (L); 18 is a right-side deviation regenerator (hereinafter referred to as the "R-side regenerator") which stores at said prescribed time intervals, said right-side deviations (R) produced during the right-side movement of the welding electrode 4 relative to said vertical plane, switched over by the changeover switch 8, and regenerates at said prescribed time intervals, said stored right-side deviations (R) when the welding electrode 4 then moves over the left side of the groove 6 relative to said vertical plane; the R-side regenerator 18 repeats storage and regeneration of said right-side deviations (R); 14 is a second differential amplifier which calculates at said prescribed time intervals, when the welding electrode 4 moves over the left side of the groove 6 relative to said vertical plane, differences (L−R) between left-side deviations (L) during this left-side movement of the welding electrode 4, on one hand, and the stored right-side deviations (R) during the immediately preceding right-side movement of the welding electrode 4, which is regenerated at said prescribed time intervals by the R-side regenerator 18, on the other hand; and similarly calculates at said prescribed time intervals, when the welding electrode 4 moves over the right side of the groove 6 relative to said vertical plane, differences (L−R) between right-side deviations (R) during this right-side movement of the welding electrode 4, on one hand, and the stored left-side deviations (L) during the immediately preceding left-side movement of the welding electrode 4, which is regenerated at said prescribed time intervals by the L-side regenerator 17, on the other hand; 15 is a motor drive controller which controllably drives a motor described later at said prescribed time intervals so that the differences (L−R) calculated by the second differential amplfier 14 become null; and, 16 is a motor which controllably moves the welding torch 4' in the width direction of the groove 6 on the basis of a driving signal from the motor drive controller 15, so that the center of amplitude of reciprocation of the welding electrode 4 agrees with the width center of the groove 6.

Figure 4:
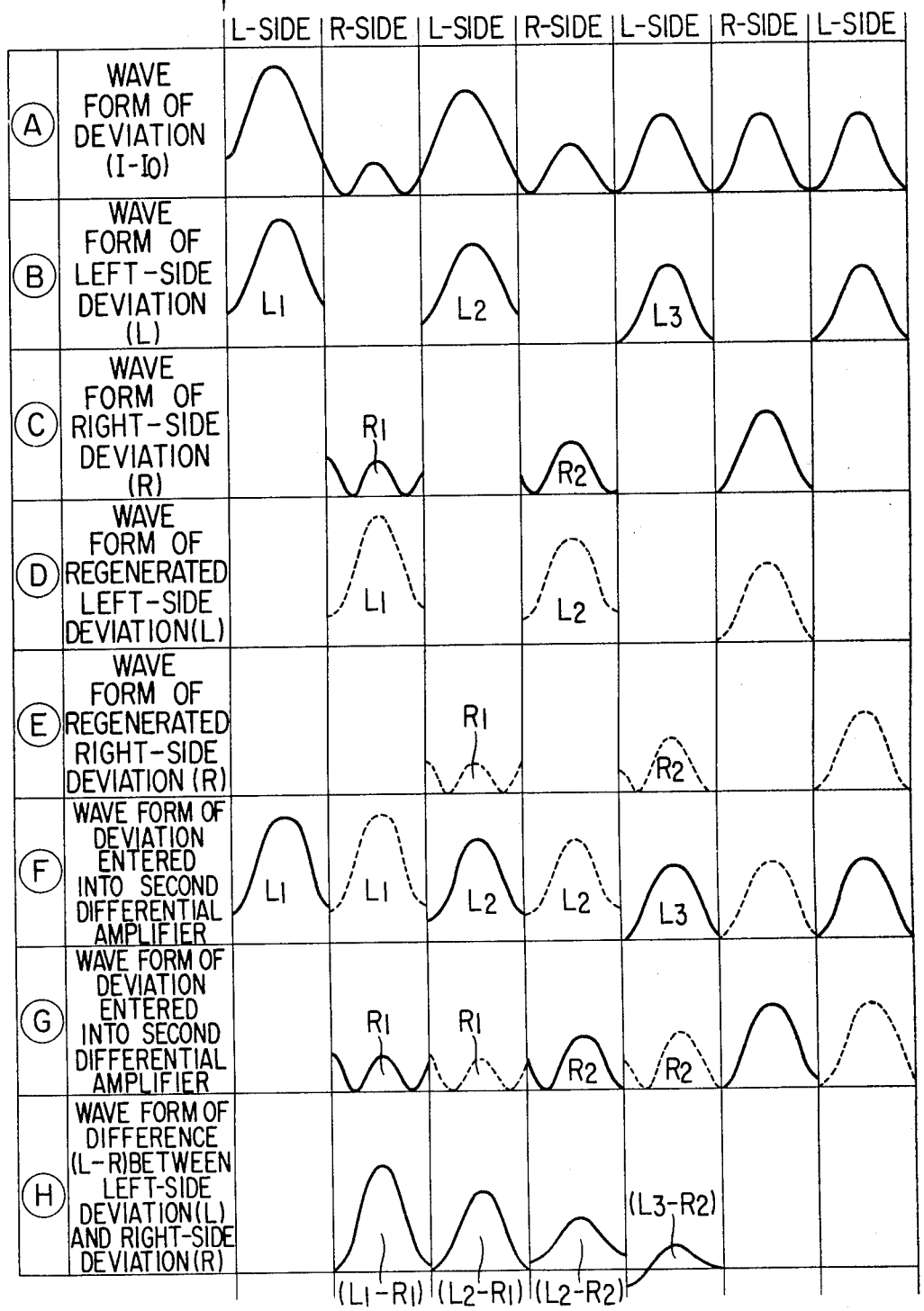

Now, the case in which, when the center of reciprocation amplitude of the welding electrode 4 deviates to the left relative to the width center of the groove 6, how the position of the welding electrode 4 is corrected so that the center of reciprocation amplitude of the welding electrode 4 agrees with the width center of the groove 6 by the above-mentioned embodiment of the present invention is described with reference to the signal wave form diagram of FIG. 4. In FIG. 4, the signal wave forms Ⓐ to Ⓗ correspond to the signal wave forms Ⓐ to Ⓗ in FIG. 3. First, the arc current detector 1 continuously detects the values (I) of arc current. The low-pass filter 2 eliminates detrimental noise current from the values (I). The first differential amplifier 7 continuously calculates, for each one reciprocation of the welding electrode 4 in the width direction of the groove 6, deviations (I−Io) (refer to Ⓐ in FIG. 4) of the values (I) from the reference value (Io) previously set by the reference value setter 3. The changeover switch 8 switches over the deviations (I−Io) alternately between the left-side deviations and the right-side deviations relative to the vertical plane which passes through the center of reciprocation amplitude of the welding electrode 4 and is parallel to the line of the groove 6, by means of pulse signals from the pulse signal generator 9. The L-side regenerator 17 stores at prescribed time intervals so example, of from 1/1,000 to 1/4,000 second, the left-side deviations ($L_1$) (refer to Ⓑ in FIG. 4) produced during the left-side movement of the welding electrode 4 relative to said vertical plane, switched over by the changeover switch 8. Then, the second differential amplifier 14 calculates at said prescribed time intervals, the differences ($L_1-R_1$) (refer to Ⓗ in FIG. 4) between the right-side deviations ($R_1$) (refer to Ⓒ in FIG. 4) at said prescribed time intervals, produced during the right-side movement of the welding electrode 4 relative to said vertical plane, on one hand, and the stored left-side deviations ($L_1$) during the immediately preceding left-side movement of the welding electrode 4, which is regenerated at said prescribed time intervals by the L-side regenerator 17, on the other hand. In FIG. 4, Ⓕ and Ⓖ represent wave forms of deviations entered into the second differential amplifier 14. During the calculation of the differences ($L_1-R_1$), the R-side regenerator 18 stores the right-side deviations ($R_1$) at said prescribed time intervals. Then, the second differential amplifier 14 calculates at said prescribed time intervals the differences ($L_2-R_1$) (refer to Ⓗ in FIG. 4) between the left-side deviations ($L_2$) (refer to Ⓑ in FIG. 4) at said prescribed time intervals, produced during the next left-side movement of the welding electrode 4 relative to said vertical plane, on one hand, and the stored right-side deviations ($R_1$) during the immediately preceding right-side movement of the welding electrode 4, which is regenerated at said prescribed time intervals by the R-side regenerator 18, on the other hand. During the calculation of the differences ($L_2-R_1$), the L-side regenerator 17 stores the left-side deviations ($L_2$) at said prescribed time intervals. Then, the second differential amplifier 14 similarly calculates the differences ($L_2-R_2$) and ($L_3-R_2$) (refer to Ⓗ in FIG. 4). The motor drive controller 15 drives the motor 16 at said prescribed time intervals for each calculation of the differences ($L_1-R_1$), ($L_2-R_1$), ($L_2-R_2$) and ($L_3-R_2$), so that these differences become null for each time, to move the welding electrode 4 in the width direction of the groove 6, whereby the center of reciprocation amplitude of the welding electrode 4 finally agrees with the width center of the groove 6.

When carrying out welding by the method of the present invention, the means for vertically moving the welding torch 4' up and down to maintain a prescribed distance between the tip of the welding electrode 4 and the groove during the reciprocation of the welding electrode 4 in the width direction of the groove 6, and the means for moving the torch 4' in the longitudinal direction of the groove 6 at a prescribed speed may be conventional ones publicly known.

The case in which the position of the center of reciprocation amplitude of the welding electrode 4 is corrected on the basis of the detected arc current has been described above in detail. This may well be conducted also by detecting the arc voltage and correcting the position of the center of reciprocation amplitude of the welding electrode 4 on the basis of this arc voltage.

According to the present invention, as described above in detail, it is possible to instantly align the center of reciprocation amplitude of the welding electrode with the width center of the groove, and hence to always form a uniform weld bead even when carrying out high-speed welding, thus providing industrially useful effects.

What is claimed is:

1. In a method for controlling the position of a welding electrode in arc-welding with weaving, which comprises:

directing a welding electrode substantially vertically toward a groove formed between objects of welding; continuously moving said welding electrode along the line of said groove while reciprocating said welding electrode in the width direction of said groove; feeding, on the other hand, a welding current to said welding electrode to produce an arc between the tip of said welding electrode and said groove to weld said objects of welding together along the line of said groove by means of the arc heat; continuously detecting values (I) of one of arc current and arc voltage of said arc during said welding; continuously calculating deviations $(I-I_o)$ of the thus detected values (I) from a previously set reference value $(I_o)$ of one of arc current and arc voltage for each one reciprocation of said welding electrode in the width direction of said groove; continuously calculating, relative to the vertical plane which passes through the center of amplitude of said one reciprocation of said welding electrode and is parallel to the line of said groove, a representative value (L') of left-side deviations (L) of said deviations $(I-I_o)$ and a representative value (R') of right-side deviations (R) of said deviations $(I-I_o)$; continuously calculating the difference $(L'-R')$ between said representative value (L') of said left-side deviations (L) and said representative value (R') of said right-side deviations (R); and, controllably aligning the center of said amplitude of said one reciprocation of said welding electrode with the center of said groove in the width direction thereof so that said difference $(L'-R')$ becomes null;

the improvement characterized by:

storing said left-side deviations (L) and said right-side deviations (R) at prescribed time intervals, said time intervals being in the range of from 1/1000 to 1/4000 second;

calculating at said prescribed time intervals when said welding electrode moves over the left side of said groove relative to said vertical plane, differences $(L-R)$ between said left-side deviations (L) at said prescribed time intervals during said left-side movement of said welding electrode, on one hand, and said stored right-side deviations (R) at said prescribed time intervals during the immediately preceding right-side movement of said welding electrode over the right side of said groove relative to said vertical plane, on the other hand; and controllably aligning the center of said amplitude of said one reciprocation of said welding electrode with the center of said groove in the width direction thereof at said prescribed time intervals so that said differences $(L-R)$ become null; and, calculating at said prescribed time intervals, when said welding electrode moves over the right side of said groove relative to said vertical plane, differences $(L-R)$ between said right-side deviations (R) at said prescribed time intervals during said right-side movement of said welding electrode, on one hand, and said stored left-side deviations (L) at said prescribed time intervals during the immediately preceding left-side movement of said welding electrode over the left side of said groove relative to said vertical plane, on the other hand, and controllably aligning the center of said amplitude of said one reciprocation of said welding electrode with the center of said groove in the width direction thereof at said prescribed time intervals so that said differences $(L-R)$ become null.

* * * * *